US007444676B1

(12) United States Patent
Asghari-Kamrani et al.

(10) Patent No.: US 7,444,676 B1
(45) Date of Patent: Oct. 28, 2008

(54) DIRECT AUTHENTICATION AND AUTHORIZATION SYSTEM AND METHOD FOR TRUSTED NETWORK OF FINANCIAL INSTITUTIONS

(76) Inventors: Nader Asghari-Kamrani, 6558 Palisades Dr., Centreville, VA (US) 20121; Kamran Asghari-Kamrani, 6547 Palisades Dr., Centreville, VA (US) 20121

( * ) Notice: Subject to any disclaimer, the term of this patent is extended or adjusted under 35 U.S.C. 154(b) by 0 days.

(21) Appl. No.: 11/239,046

(22) Filed: Sep. 30, 2005

Related U.S. Application Data

(63) Continuation-in-part of application No. 09/940,635, filed on Aug. 29, 2001.

(60) Provisional application No. 60/615,603, filed on Oct. 5, 2004.

(51) Int. Cl.
*G06F 7/04* (2006.01)
*G06F 19/00* (2006.01)
*H04L 9/32* (2006.01)
*H04L 9/00* (2006.01)

(52) U.S. Cl. .............................. 726/21; 726/4; 713/168; 713/170; 705/44; 705/64; 705/67

(58) Field of Classification Search ................ 726/4, 726/21; 713/168, 170; 705/64, 67, 44
See application file for complete search history.

(56) References Cited

U.S. PATENT DOCUMENTS 5,838,812 A * 11/1998 Pare et al. .................... 382/115
5,883,810 A * 3/1999 Franklin et al. ............... 705/39

6,529,885 B1 * 3/2003 Johnson ....................... 705/64
6,748,367 B1 * 6/2004 Lee ............................. 705/66
2001/0044787 A1 * 11/2001 Shwartz et al. ............... 705/78

OTHER PUBLICATIONS

Federal Financial Institutions Examination Council(Oct. 2005)"Authentication in an Internet Banking Environment"available at http://www.ffiec.gov/pdf/authentication_guidance.pdf.
"Will Financial Institutions Really by more Secure with 2-Factor Athentication?" available at http://www.securitypark.co.uk/article.asp?articleid=25011&CategoryID=1%C2%A0.
"Experts Struggle to Fight Online 'Phishing'" (May 4, 2006) available at http://domainsmagazine.com/Domains_14/Domain_2830.shtml.

* cited by examiner

Primary Examiner—Benjamin E. Lanier
Assistant Examiner—Abdulhakim Nobahar

(57) ABSTRACT

A system and method for direct authentication and/or authorization of transactions. The system includes a trusted Digital Identity (DID) Network connecting an Originating Participating Financial Institution (OPFI) and a Receiving Participating Financial Institution (RPFI) through a DID Operator. The DID Operator may further be coupled to a DID System that calculates digital identities for Originators. According to the method, direct authentication of the Originator and/or authorization of the transaction is initiated upon the Originator communicating its digital identity to the Receiver. The Receiver subsequently provides the digital identity to the RPFI. The RPFI is then able to communicate with the OPFI for authentication of the Originator and/or authorization of the transaction through the DID Operator based on Originator's digital identity. The transaction between the Originator and Receiver can be financial or non-financial and may include, for example, account-to-account transfers, identity authentication or express agreements. In another embodiment, authentication and/or authorization may be performed in real time.

20 Claims, 11 Drawing Sheets

US 7,444,676 B1

DIRECT AUTHENTICATION AND AUTHORIZATION SYSTEM AND METHOD FOR TRUSTED NETWORK OF FINANCIAL INSTITUTIONS

CROSS-REFERENCE TO RELATED APPLICATIONS

This application is a continuation in part of and claims priority to U.S. patent application Ser. No. 09/940,635 filed Aug. 29, 2001. This application also claims priority to U.S. provisional patent application Ser. No. 60/615,603 filed Oct. 5, 2004.

BACKGROUND OF THE INVENTION

1. Field of the Invention

The present invention generally relates to a direct authentication and authorization system and method for trusted network of financial institutions allowing them to directly authenticate their customers and receive their authorization of financial transactions over a communication network such as the Internet. More specifically, the present invention is based on a new identification and authentication scheme as digital identity that enables financial institutions to directly authenticate their account owners and/or receive their authorization of financial transactions over a communication network such as the Internet.

2. Background of the Invention

With the advent of the Internet, the number of online financial transactions has increased dramatically. With this increase, concerns for the security of the financial transactions, proof of authorization for such transactions, and the need for direct authentication of the parties to these transactions have also risen. Therefore the Internet is more than just a different delivery channel for online financial transactions. There are two unique characteristics of the Internet that require special considerations:

The anonymity of the Internet creates an environment in which parties are not certain with whom they are doing business, which poses unique opportunities for fraud The Internet is an open network, which requires special security procedures to be deployed to prevent unauthorized access to the consumer financial information These unique characteristics of the Internet needed to be addressed by financial institutions in order to maintain their dominance in the payment arena. Today, any authentication over a communication network such as the Internet is an indirect authentication. Meaning, customers provide confidential, personal and financial information, in the form of social security numbers, names, addresses, credit card and bank account numbers, and businesses verify this information by accessing external databases. This type of authentication is not sufficient to truly identify the identity of customers and tell whether the customer is the actual account owner. This is why financial institutions have limited their online interbank and intrabank service offerings. For example, today, the financial institutions require their account owners to do their interbank funds transfer at a branch office and send a physical check to the receiver of the funds for payment, both of which are inconvenient and burdensome to corporate and individual customers.

NACHA (National Clearing House Association) operating rules and federal government regulations also require financial institutions to authenticate their customers' identity and receive their authorization for any type of financial transaction such as payment or funds transfer over the Internet. In the physical world, financial transactions are authorized by the account owners in writing and signed or similarly authenticated. In the online world however, financial institutions do not have any solution to meet these requirements. An electronic authorization for an online transaction should be authenticated by a method that 1) identifies the customer (account owner), and 2) manifests the assent of the customer to the authorization. Therefore, financial institutions must use a method that provides the same assurance as a signature in the physical world (a signature both uniquely identifies a person and evidences his assent to an agreement). These objectives should be met by whatever method or process a financial institution employs when obtaining a customers' authorization electronically.

When dealing with customers over any communication network such as the Internet, financial institutions are facing numerous challenges:

Be able to identify the identity of the customers;

Be able to obtain transaction authorization from customers over the Internet;

Be able to confirm that the customer is the account owner and is authorized to use such account Financial institutions must meet these challenges in order to expand their online service offerings (interbank and intrabank) and maintain their dominance in the market. But lack of identification and real-time account verification methods have prevented financial institutions to achieve their goals.

Today, there are three different identification and authentication schemes in the market:

Knowledge-based, which involve allowing access according to what a user knows;

token-based, which involve allowing access according to what a user possesses;

biometrics-based, which involve allowing access according to what the user is.

Due to various problems the current authentication schemes have, financial institutions have not been able to successfully use these technologies to perform direct authentication and authorization of their customers. Passwords are inexpensive and easy to use, but the static nature of passwords, makes them vulnerable for replay attacks. Another drawback of passwords is that online banking password cannot be used for identification and verification of financial account at the third party web sites. Biometrics can also be useful for user identification, but one problem with these schemes is the difficult tradeoff between imposter pass rate and false alarm rate. In addition, many biometric systems require specialized devices, which may be expensive. Token-based schemes are problematic as well. These are expensive to implement and require users to install special devices and software. Most token-based authentication systems also use knowledge-based authentication to prevent impersonation through theft or loss of the token.

National Clearing House Association (NACHA) and several financial institutions such as Visa and MasterCard have also attempted to develop authentication systems and methods, such as ISAP (Internet Secure ATM Payments) and SET (Secure Electronic Transaction) using smart card technology, but due to aforementioned smart card problems they failed to achieve customer acceptance. Therefore, they are now experimenting new password based programs such as VPAS (Visa Payer Authentication Service) and UCAF (MasterCard Payer Authentication Service) to allow registered cardholders to verify their purchases, a process known as payer authentication, but unfortunately these have abovementioned password issues and are specific to credit card transactions and do not apply to bank account transactions. It is also very difficult for a customer to manage. Owning N different credit cards requires recalling N different passwords for payment at checkout. According to a survey from Jupiter Media Metrix (epaynews.com, Feb. 21 2002), these systems and methods are also complicating the picture for consumers, who are worried by the mix of identification and authentication schemes.

As for the financial account ownership verification, currently, there are several companies that are attempting to bring systems and methods for verifying account ownership, such as Paypal (EBAY) and CashEdge.

Paypal introduces a system that initiates one or more verifying transactions using financial account information given by the customer. Selected details of the transaction(s) are saved, particularly details that may vary from one transaction to another. Such variable details may include the number of transactions performed, the amount of a transaction, the type of transaction (e.g., credit, debit, deposit, withdrawal), the merchant name or account used by the system for the transaction, etc. The customer then retrieves evidence of the transaction(s) from his or her financial institution, which may be accomplished on-line, by telephone, in a monthly statement, etc., and submits the requested details to the Paypal system. The submitted details are compared to the stored details and, if they match, the account ownership is verified and the customer is then allowed to use the financial account. There are many drawbacks associated with the Paypal's system, including:

No real-time account verification: It takes 2 to 3 days to verify customer's financial account High cost: Paypal suggests sending two deposits (credits) to the user's financial account, each of which is less than $0.99 in value.

Weak account verification: An unauthorized individual who has access to the details about verifying transactions would be verified as the account owner.

CashEdge's system requires the customer to provide bank account information along with the username and password of the online banking web site that the customer is using to access his/her bank account. The system then applies the customer's username and password to login to the online banking system for verification of the account ownership. The drawback of CashEdge system includes:

Security and Privacy Concerns: Requesting the customer to provide the online banking username and password to CashEdge raises customers' security and privacy concerns.

Weak account verification: An unauthorized individual who has access to the customer's username and password would be verified as the account owner.

Fraud Risk: Without CashEdge's system, a fraudster who has access to customer's online banking username and password, is not able to transfer funds from the customer's account, but CashEdge system provides this opportunity to an unauthorized individual to commit fraud.

Financial institutions need a system that eliminates the aforementioned problems and concerns by:
  verifying customers' identity
  verifying account ownerships in real-time
  providing prove of transaction authorization
  being secure, inexpensive and easy to use
  not requiring financial institutions to change their existing systems and processes
  covering bank account as well as credit card transactions For convenience, the term "customer" is used throughout to represent a financial institution's individual or corporate customer.

The term "financial institution" is used herein to denote any institution such as bank, credit card issuer, brokerage firm, debit card or credit card Company such as Visa, Master card, and AMEX or any other company that offers financial services.

The term "financial account" is used herein to denote any bank account, brokerage account, debit card and credit card account.

The term "account ownership verification" is used herein to denote the process of verifying that the financial account belongs to the customer and the customer is authorized to use such financial account.

The term "communication network" is used herein to denote any private, wireless or public network such as Internet.

The term "indirect authentication" is used herein to denote any authentication method that authenticates the customers based on customers' information. Meaning, customers provide confidential, personal and financial information, in the form of social security numbers, names, addresses, credit card and bank account numbers, and businesses verify this information by accessing external databases.

The term "direct authentication" is used herein to denote any authentication method that authenticates the customers based on customers' credentials such as biometric data or smart card.

The term "funds transfer network" is used herein to denote any network that financial institutions use to transfer funds, such as ACH, Fed wire, Visa network.

The term "interbank funds transfer" is used herein to denote account-to-account funds transfer between accounts at different financial institutions.

The term "debit pull" is used herein to denote the way electronic payments and funds transfer are authorized and executed, where the receiver of funds is asking customer's financial institution to debit the customer's account.

The term "credit push" is used herein to denote the way electronic payments and funds transfer are authorized and executed, where the customer instructs his/her financial institution to credit the account of the receiver (e.g. merchant account).

The term "digital identity" is used herein to denote a dynamic, non-predictable and time dependent alphanumeric code, or any other key, which may be given by customer's financial institution to the customer over a communication network such as the Internet, and may be valid for one-time use. The customer's digital identity is used for identification, authentication and authorization purposes for processing transactions over the communication network. Digital identity is calculated using a proprietary algorithm that may include any other customer and/or transaction specific information to make the digital identity customer and transaction specific.

The term "identity authority" is used herein to denote any entity that offers direct authentication services to other businesses. Identity authority issues and manages the digital identity.

The term "Digital Identity System" is used herein to denote the system that deals with the calculation, transformation and validation of the digital identity using a proprietary algorithm.

The term "Digital Identity Network" is used herein to denote the trusted network between financial institutions using any communication network such as the Internet. The Digital Identity Network enables the communication between financial institutions to send and receive Digital Identity Messages for identification and authentication of account owners and authorization of financial transactions.

The term "Digital Identity Message" is used herein to denote the message sent or received over the Digital Identity Network that may include customer's digital identity and transaction information.

SUMMARY OF THE INVENTION

The present invention provides solution to the aforementioned problems and the challenges the financial institutions face today. The present invention relates to a direct authentication and authorization system and method for trusted network of financial institutions allowing them to directly authenticate their customers and receive their authorization of financial or non-financial transactions over a communication network such as the Internet.

To overcome the drawbacks of the known systems and methods discussed above, the present invention is based on a new identification and authentication method as digital identity. The new digital identity-based identification and authentication system and method:

- verifies customers' identity
- verifies account ownerships in real-time
- provides prove of transaction authorization
- reduces the risk of fraud and identity theft
- is secure, inexpensive and easy to use
- does not require financial institutions to change their existing systems and processes
- could be utilized for bank account as well as credit card transactions The digital identity is an alphanumeric code and unlike password, biometric and smart card, the digital identity may be valid for one time use and is dynamic, non-predictable and may be time dependent, which is calculated using a proprietary algorithm that may include other customer's specific information, which makes the digital identity customer specific. Thus, it is impossible to calculate the same digital identity for two different customers or two different customers receive the same digital identity. Therefore, the digital identity offers the benefits of a password, biometric and smart card, without their disadvantages. It's as easy to use as password and as secure as biometric and smart card.

This invention comprises of Digital Identity System and Digital Identity Network. The Digital Identity System deals with the calculation, transformation and validation of the digital identity. The Digital Identity Network is the trusted network between financial institutions that enables the communication between financial institutions to send and receive Digital Identity Messages for identification and authentication of account owners and authorization of financial or non-financial transactions. The Digital Identity Message may include customer's digital identity and transaction information.

Direct authentication and authorization system and method according to the present invention may include the following participants:

Originator—the Originator is the individual or corporate customer of the Participating Financial Institution (PFI). The Originator receives a new digital identity from its Participating Financial Institution (PFI) each time the Originator desires to initiate and authorize any non-financial or financial transaction such as payment or funds transfer. The Originator provides the digital identity to the Receiver for identification, authentication and/or authorization of the transaction.

Receiver: Receiver is the individual or corporate customer of the Participating Financial Institution (PFI) that receives Originator's digital identity for identification, authentication and/or authorization of the non-financial or financial transaction such as payment or funds transfer.

PFI—the Participating Financial Institution is the financial institution that has an existing relationship with Originators and/or Receivers and offers services to the Originators and/or Receivers. When a PFI serves Originators, the PFI is acting as an Originating Participating Financial Institution (OPFI) and when a PFI serves Receivers the PFI is acting as a Receiving Participating Financial Institution (RPFI). A Participating Financial Institution (PFI) may participate in the Digital Identity Network as an OPFI as well as a RPFI.

DID Operator—the Digital Identity Operator is the digital identity authority that provides digital identity-based authentication and authorization services to the Participating Financial Institutions (PFIs) by maintaining, operating and managing the Digital Identity System and Network. Each time the Originator desires to initiate and authorize any non-financial or financial transaction such as payment or funds transfer, its Participating Financial Institutions (OPFI) requests the DID Operator to calculate a new digital identity for that Originator.

Financial institutions need to become the Digital Identity Network participants to perform identification and authentication of their customers and/or receive their authorization of transactions.

This invention enables financial institutions and their business customers to perform identification and authentication of their customers and/or to manifest their assent to the authorization of transactions. The customer's digital identity, which has been provided to that customer by the customer's financial institution, is issued and used at the time when third parties (e.g. merchant, billers) or other Participating Financial Institution needs to authenticate the customer's identity, verify the account ownership and/or receive the customer's authorization for the financial or non-financial transaction. Participating Financial Institutions issue digital identities to their account holders and validate digital identities issued by other Participating Financial Institutions in real time. Using Digital Identity System and Network, financial institutions can establish an environment in which parties to a transaction can reliably verify the electronic identities of customers, engage in legally binding agreements, and maintain auditable electronic information trails. The resulting high level of security and trust enables financial institutions to better serve the customers by enhancing their online service offerings.

This invention enables financial institutions to enhance security and reduce fraud by identifying their customers and account holders. This will allow them to provide various services to their customers. As an example, the invention may be used in interbank funds transfer transactions to perform identification and authentication, receive customers' authorization and verify account ownership. As another example, the invention may be used in online payment transactions to perform identification and authentication of customers, receive customers' authorization, obtain payments and receive account ownership verification.

As another example, the invention may be used in identity verification service offered by financial institutions to provide customer identification in e-commerce.

This invention relates to a system and method for verification of customers' identity over a communication network such as the Internet.

Accordingly, it is a principal objective of the invention to perform account ownership verification in real-time over a communication network such as the Internet.

It is another objective of the invention to allow all parties involved in a transaction to give and receive transaction authorization over a communication network such as the Internet.

It is another objective of the invention to provide a direct authentication and authorization system and method that is secure, inexpensive, easy to use and offers privacy to the financial institutions customers.

It is another objective of the invention to provide a direct authentication and authorization system and method that does not require financial institutions to change their existing systems.

It is another objective of the invention to provide a direct authentication and authorization system and method that is independent from any financial institution and applies to various types of financial accounts.

It is another objective of the invention to reduce fraud and identity theft and increase security.

It is another objective of the invention to build a circle of trust between customers, financial institutions, and businesses in e-commerce.

It is another objective of the invention to enable financial institutions to become the identity authority.

These and other objects of the present invention will become readily apparent upon further review of the following specification and drawings.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
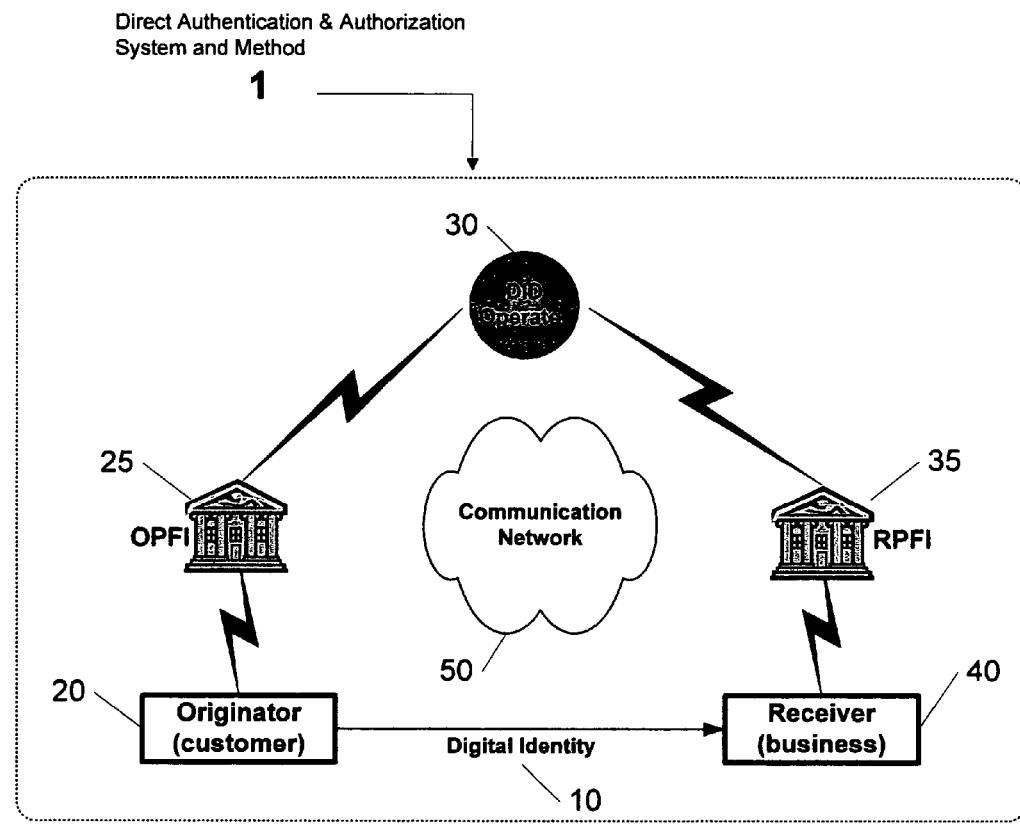
FIG. 1 is a high-level overview of a direct authentication and authorization system and method for trusted network of financial institutions according to the present invention.

The present invention FIG. 1 relates to a direct authentication and authorization system and method 1, for trusted network of financial institutions 25, 35 allowing them to directly authenticate their customers 20 and receive their authorization of financial or non-financial transactions over a communication network 50 such as the Internet. More specifically, the present invention is based on a new identification and authentication method as digital identity 10 that enables financial institutions 25, 35 to directly authenticate their account owners 20 and/or receive their authorization of financial or non-financial transactions over a communication network 50 such as the Internet. The digital identity 10 based authentication is secure, inexpensive, easy to use and does not require financial institutions' customers 20 to install any hardware or software on their systems.

The digital identity 10 is an alphanumeric code and unlike password, biometric and smart card, the digital identity 10 is dynamic, non-predictable and may be time dependent, which is calculated using a proprietary algorithm that may include other customer's 20 specific information, which makes the digital identity 10 customer 20 specific. Thus, it is impossible to calculate the same digital identity 10 for two different customers 20 or two different customers 20 receive the same digital identity 10. Those skilled in the art appreciate that for digital identity 10 many different configurations are possible. In one embodiment the digital identity 10 is valid for one-time use and in another embodiment the digital identity is valid for multiple-time use.

The digital identity 10 is:
 Dynamic—each time a digital identity 10 is requested, a different digital identity 10 is calculated;
 Non-predictable—there is no concern with recognizing the pattern, therefore it is impossible to predict the next digital identity 10;
 Time dependent—the digital identity 10 may be valid within certain time constraints to prevent replay attacks;
 Sensitive—any change to a digital identity 10 in transit results in an invalid digital identity 10.

The digital identity 10 offers the benefits of a password, biometric and smart card, without their disadvantages. It 10 is as easy to use as password and as secure as biometric and smart card.

Figure 2:
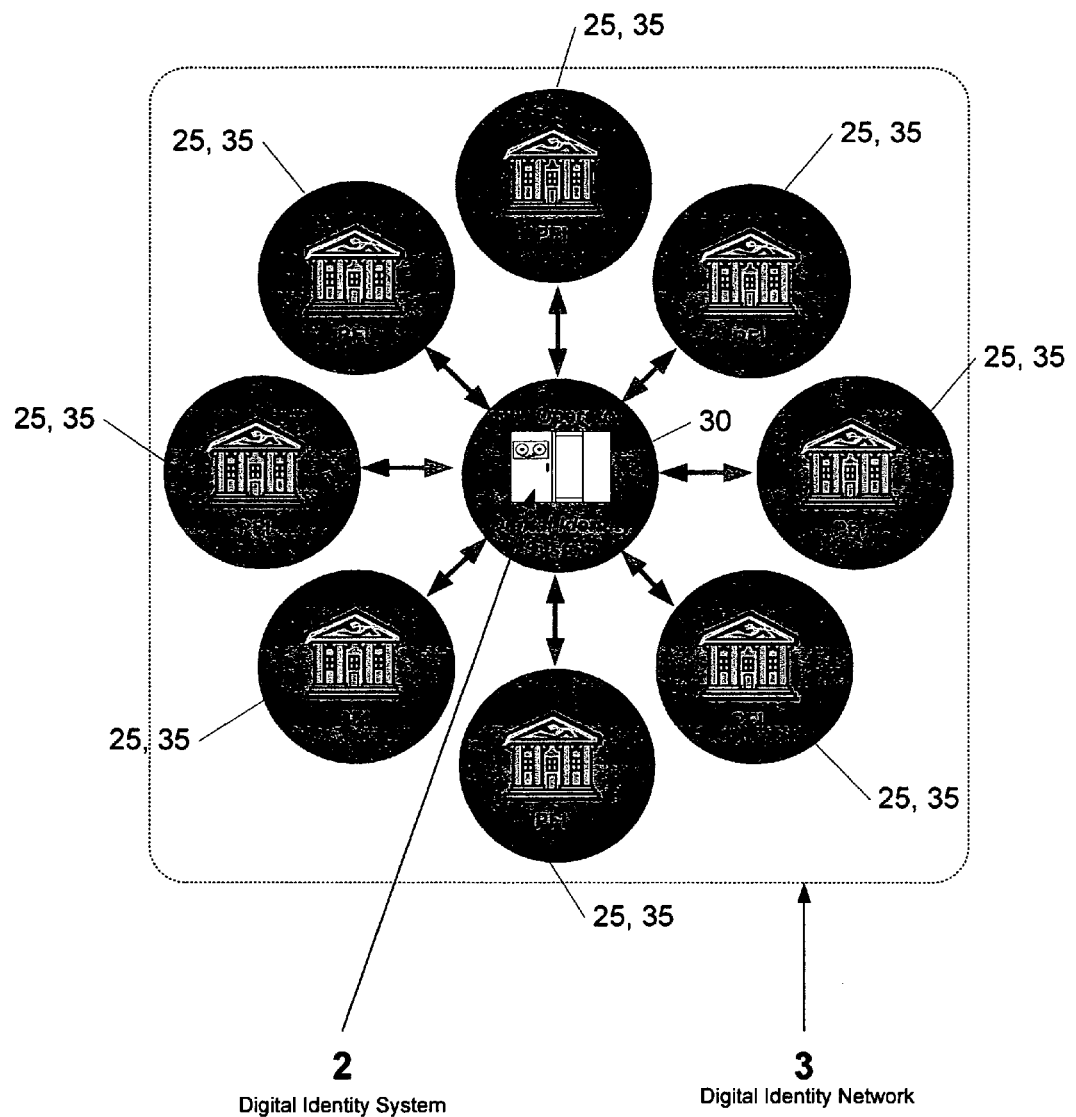
FIG. 2 is a high-level overview of Digital Identity System and Digital Identity Network in a direct authentication and authorization system and method according to the present invention.

As illustrated in FIG. 2, this invention comprises of Digital Identity System 2 and Digital Identity Network 3. The Digital Identity System 2 deals with the calculation, transformation and validation of the digital identity 10 using a proprietary algorithm. The Digital Identity Network 3 is the trusted network between financial institutions 25, 35 that enables the communication between financial institutions 25, 35 to send and receive Digital Identity Messages for identification and authentication of account owners 20 and authorization of financial or non-financial transactions. The Digital Identity Message may include customer's digital identity 10 and transaction information. When a financial institution 25, 35 agrees to use the Digital Identity System 2, the financial institution 25, 35 will participate in the Digital Identity Network 3 to interchange authentication and authorization messages as well as Digital Identity Messages with other Participating Financial Institutions 25, 35.

The Digital Identity System 2 and Digital Identity Network 3 are managed and operated by the DID Operator 30.

The Digital Identity Network 3 is used for identification and authentication of the financial institutions' 25, 35 account owners 20 and/or authorization of financial or non-financial transactions. The Digital Identity Network 3 will not be used for the transfer of the actual funds between financial institutions 25, 35. Upon successful authentication and authorization, the Participating Financial Institutions 25, 35 or any third party on their behalf, will use their desired funds transfer network, such as ACH or Fed wire, to transfer funds between accounts.

Performing identification, authentication and authorization using digital identity 10 is secure. It is possible to compute millions of digital identities 10 for the same customer 20, and it is computationally infeasible to find customer's information from a given digital identity 10, or to find two different customers 20 with the same digital identity 10. Any change to a digital identity 10 in transit will fail to verify. The timing and dynamic nature of the digital identity protects the system 1 from replay attacks. Therefore the digital identity 10 offers more benefits to the financial institutions 25, 35, and their customers 20, 40 than the existing technologies such as biometrics.

Figure 3:
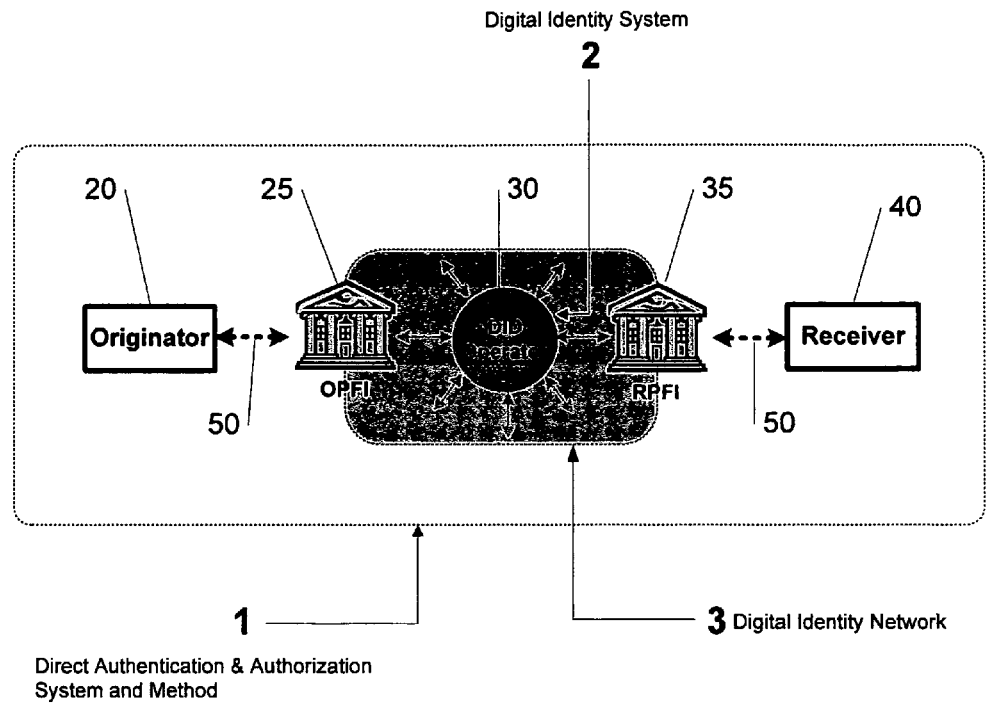
FIG. 3 illustrates the participants of direct authentication and authorization system and method according to the present invention.

Direct authentication and authorization system and method 1, FIG. 3 according to the present invention may include the following participants:

Originator 20: The Originator 20 is the individual or corporate customer of the Participating Financial Institution (PFI) 25, 35. The Originator 20 receives a new digital identity 10 from its Participating Financial Institution (PFI) 25 each time the Originator 20 desires to initiate and authorize any non-financial or financial transaction such as payment or funds transfer. The Originator 20 provides the digital identity 10 to the Receiver 40 for identification, authentication and/or authorization of the transaction. A plurality of Originators 20 has an existing relationship with a Participating Financial Institution (PFI) 25. The Originator 20 could also act as a Receiver 40 in a transaction.

Receiver 40: The Receiver 40 is an individual or corporate customer of the Participating Financial Institution (RPFI) 35 that receives Originator's 20 digital identity 10 for identification, authentication and/or authorization of the non-financial or financial transaction such as payment or funds transfer. The Receiver 40 processes the digital identity 10 received from the Originator 20 through its existing relationship with its Participating Financial Institution (RPFI) 35. The Receiver 40 could also act as an Originator, 20 in a transaction.

PFI 25, 35: The Participating Financial Institution 25, 35 is an institution that has an existing relationship with a plurality of Originators 20 and/or Receivers 40 and offers services to them 20, 40. When a PFI serves the Originator 20, the PFI is acting as an Originating Participating Financial Institution (OPFI) 25 and when a PFI serves the Receiver 40 the PFI is acting as a Receiving Participating Financial Institution (RPFI) 35. A Participating Financial Institution (PFI) could act as an OPFI 25 as well as a RPFI 35.

DID Operator (Digital Identity Operator) 30: The DID Operator 30 is the digital identity authority that provides digital identity-based authentication and authorization services to the Participating Financial Institutions (PFIs) 25, 35 by maintaining, operating and managing the Digital Identity System 2 and Network 3. Each time the Originator 20 desires to initiate and authorize any non-financial or financial transaction such as payment or funds transfer, its Participating Financial Institutions (OPFI) 25 requests the DID Operator 30 to calculate a new digital identity 10 for that Originator 20. A plurality of Participating Financial Institutions 25, 35 (PFIs) have an existing relationship with the DID Operator 30 to process digital identities. There could be a single DID Operator 30 or multiple DID Operators 30 that are connected by a communication network 50 to perform as one.

As illustrate in FIG. 3, a Participating Financial Institution 25, 35 communicates with other Participating Financial Institutions 25, 35 through the DID Operator 30 over the Digital Identity Network 3.

The Originator 20, the Participating Financial Institutions (PFIs) 25, 35, the Receiver 40 exchange information and messages over any communication network 50 such as the Internet.

When dealing with customers 20 over any communication network 50 such as the Internet, financial institutions 25, 35 are able, for any type of services, to use the digital identity-based authentication and authorization system and method 1 to perform identification and authentication of their customers 20, receive their authorization and verify account ownership.

As one example, the invention could be used in an interbank funds transfer transaction where identification, authorization and verification of account ownership at both side of the transaction are required. In this example FIG. 4, 5, 6, 7, a financial institution's 25 customer 20 requests to transfer funds between his/her accounts at two different financial institutions 25, 35. In Interbank funds transfer, the customer 20 acts as an Originator 20 as well as a Receiver 40. This example highlights the benefits of this invention to the customer (Originator) 20, the Originating Participating Financial Institution (OPFI) 25 and the Receiving Participating Financial Institution (RPFI) 35, where both Participating Financial Institutions (PFIs) are able to identify the customer 20, receive the evidence of the account ownership and the transaction authorization.

Figure 4:
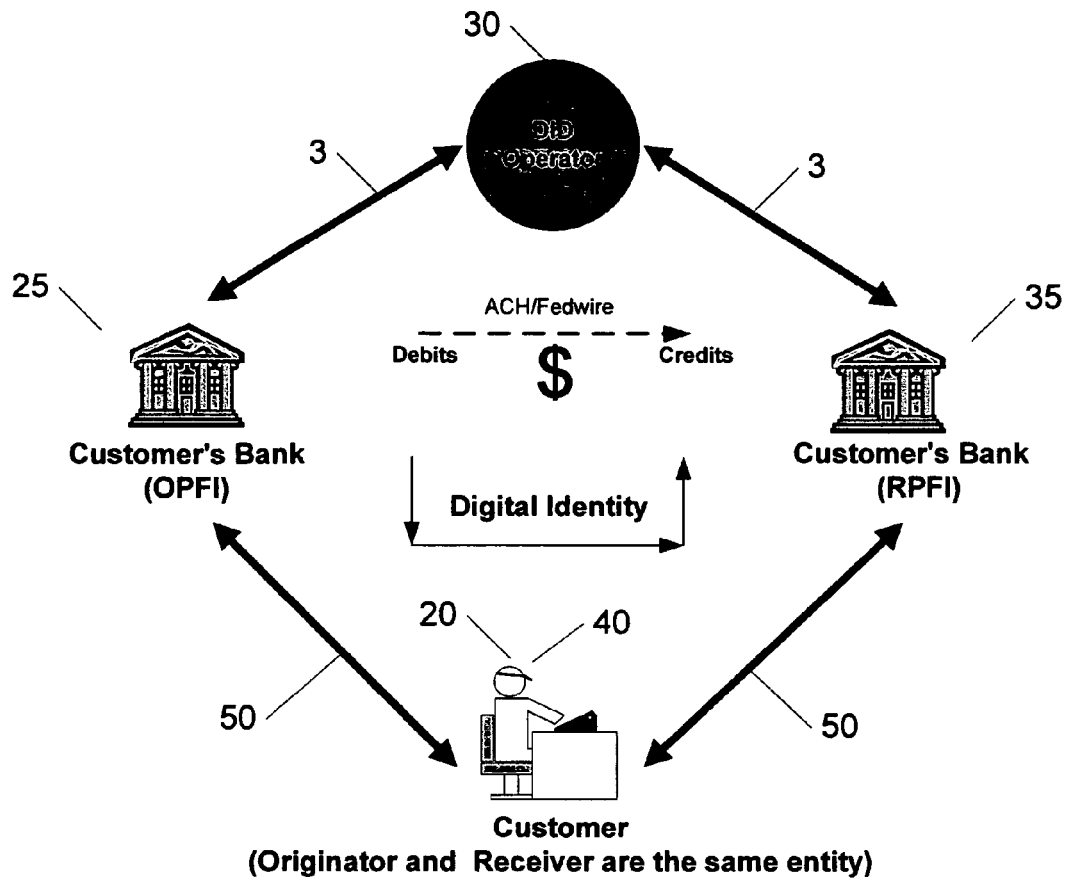
FIG. 4 illustrates financial institutions utilizing direct authentication and authorization system and method to process an interbank funds transfer transaction according to the present invention.
Figure 5:
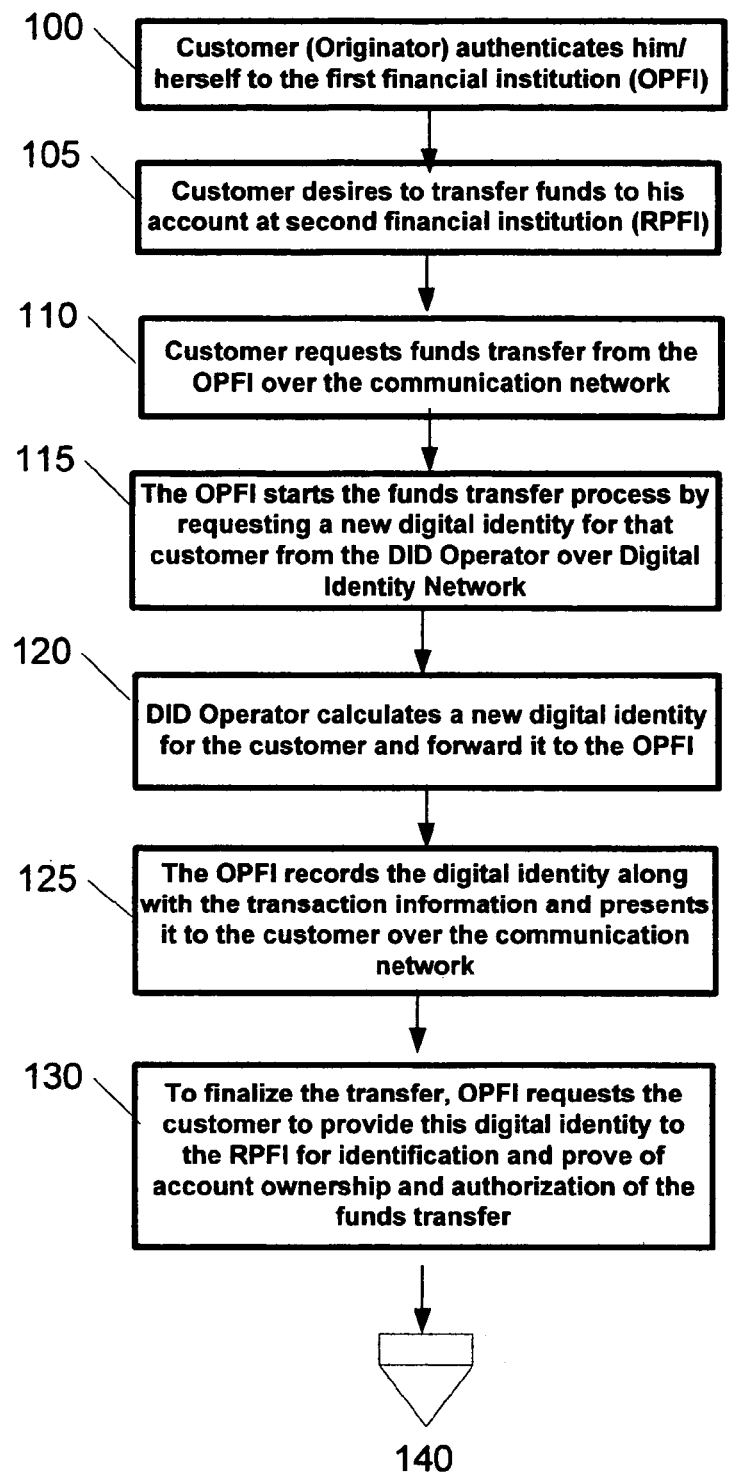
FIG. 5, 6, 7 are block diagrams illustrating the process flow of financial institutions utilizing direct authentication and authorization system and method to process an interbank funds transfer transaction according to the present invention.
Figure 6:
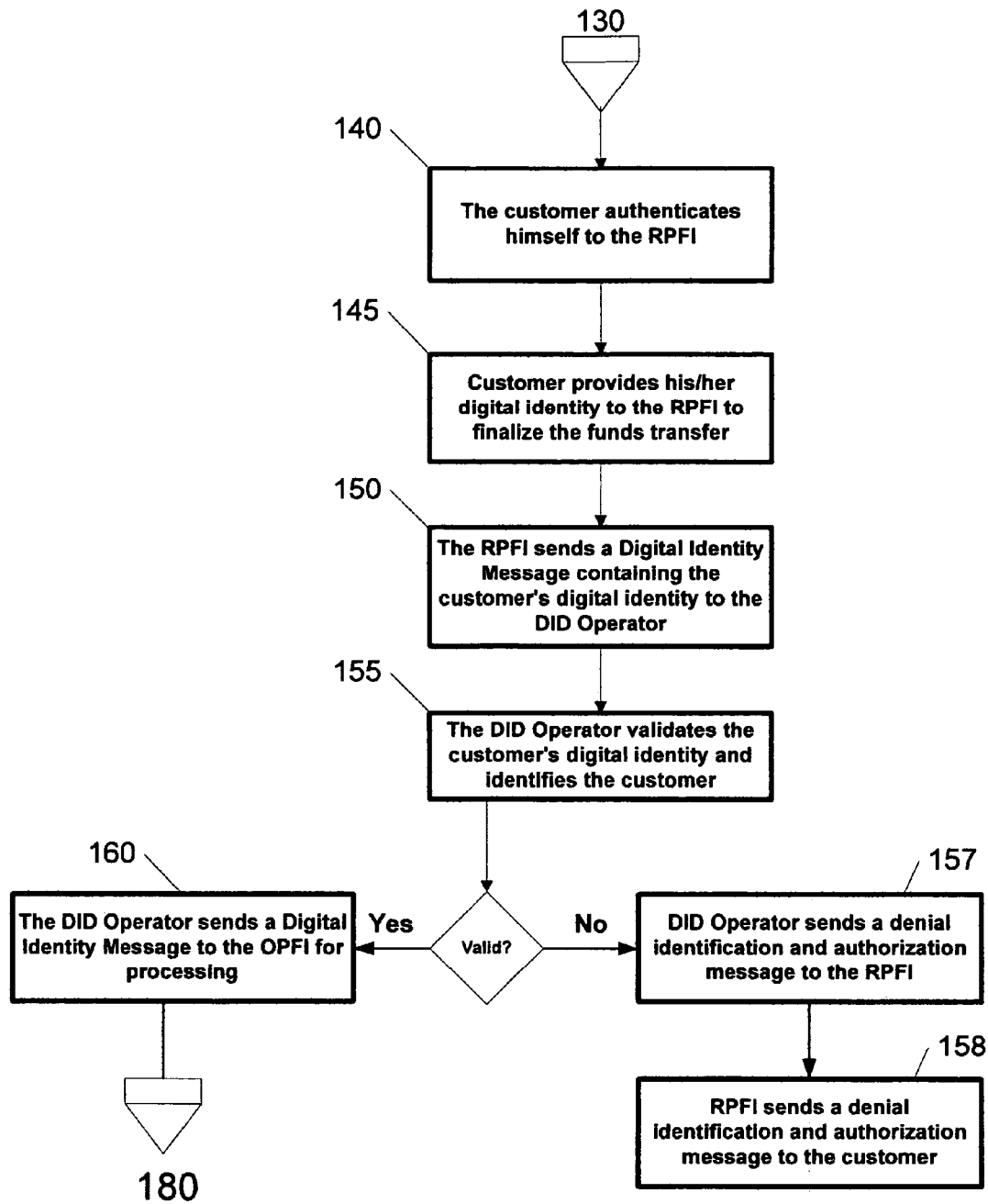
Figure 7:
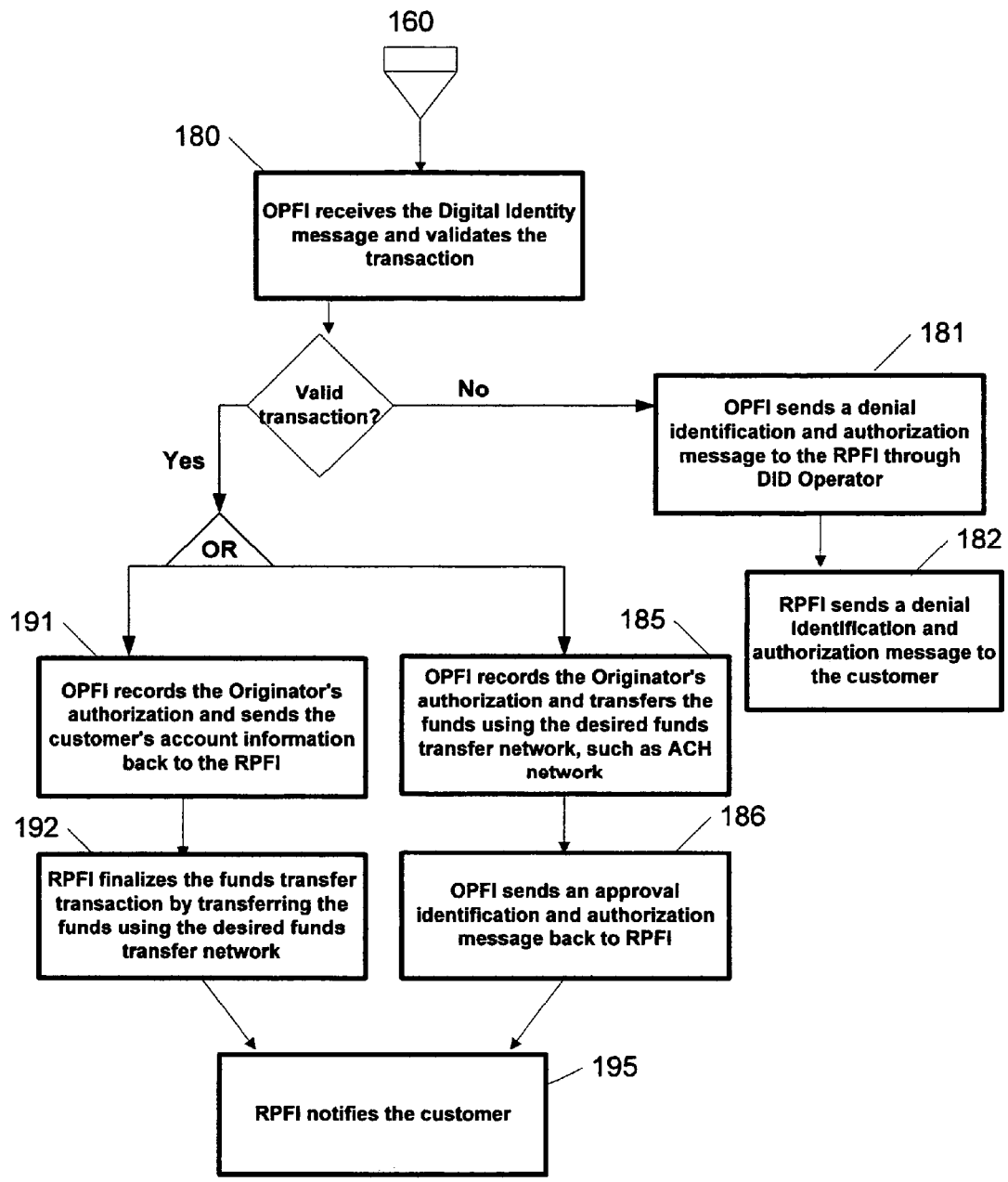
Figure 8:
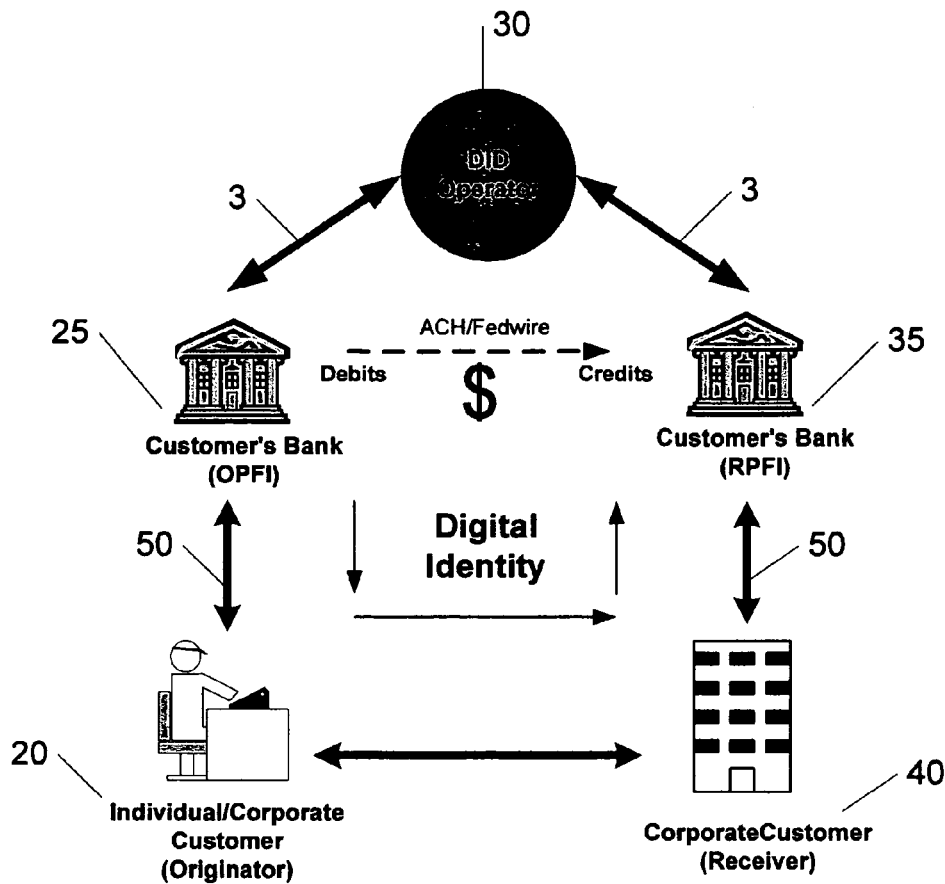
FIG. 8 illustrates financial institutions utilizing direct authentication and authorization system and method to process an online payment transaction according to the present invention.

To request an interbank funds transfer FIG. 4, FIG. 5 between two different Participating Financial Institutions 25, 35, the customer (Originator) 20 authenticates him/herself to the first financial institution (OPFI) 25 over a communication network 50, 100 and requests an interbank funds transfer 105, 110. The OPFI 25 starts the funds transfer process by requesting a new digital identity 10 for that customer (Originator) 20 from the DID Operator 30 over the Digital Identity Network 3, 115.

The DID Operator 30 that manages the Digital Identity System 1, processes the request, calculates a new digital identity 10 that may be specific to that customer 20 and/or transaction, and forwards the customer's digital identity 10 to the OPFI 25 over the Digital Identity Network 3, 120. For security reasons, the customer's digital identity 10 could be time dependent and may be valid for one-time use.

When the OPFI 25 receives the customer's digital identity 10 from the DID Operator 30, the OPFI 25 present that to the customer (Originator) 20 over the communication network 50. The OPFI 25 might also record the digital identity 10 along with the transaction information for its authentication and authorization purposes 125. In addition to providing the digital identity 10 to the customer 20 (Originator), the OPFI 25 may request the customer (Originator) 20 to provide the digital identity 10 to the second financial institution (ORFI) 35 to finalize and complete the funds transfer transaction 130. Since the customer's digital identity 10 is used for identification, authorization of funds transfer and as evidence of account ownership, the funds transfer transaction will not be finalized unless the customer 20 provides his/her digital identity 10 to the RPFI (second financial institution) 35.

The customer (Receiver) 20 authenticates him/herself to the RPFI 35 over a communication network 50, 140 and provides his/her digital identity 10 to the RPFI 35 and requests to finalize the funds transfer 145. The RPFI 35 may also request the customer 20 to provide other customer specific information for validation.

The RPFI 35 may validate the information provided by the customer 20 and for validation of customer's digital identity 10 and the transaction processing, the RPFI 35 may forward a Digital Identity Message 15 containing the customer's digital identity 10 to the DID Operator 150.

The DID Operator 30, upon receiving the Digital Identity Message from the RPFI 35, validates the customer's digital identity 10 and identifies the customer (Originator) 20, 40, 155. Upon successful validation and identification, the DID Operator 30 may send a Digital Identity Message containing the customer's digital identity 10 and possibly other transaction information to the OPFI 25 for processing 160.

The OPFI 25, upon receiving the Digital Identity Message from the DID Operator 30, may validate the customer's digital identity 10 and/or verify the transaction 180. A valid digital identity 10 provides evidence that the customer 20 is the actual account owner at the receiving bank (RPFI) 35 and manifest customer's assent to the transaction. An invalid digital identity 10 will cause a denial message to be sent to the RPFI and to the customer 20, 157, 181, 182.

Upon successful validation, the OPFI 25 might record the transaction authorization and may either:
  finalizes the funds transfer transaction by sending credit to customer's 20 account at the RPFI 35 using the desired funds transfer network, such as ACH network and notifies the RPFI (credit push) 185; or
  sends the customer's 20 account information back to the RPFI 35 and RPFI 35 finalizes the funds transfer transaction by sending debit to the customer's 20 account at the OPFI 25 using the desired funds transfer network, such as ACH network (debit pull) 191.

The RPFI 35 may be responsible for notifying the customer (Receiver) 20 of the status of the transaction 195. To the RPFI 35, the validation of the customer's digital identity 10 is the evidence of the account ownership at the OPFI 25 and proves the customer's assent to the funds transfer transaction (transaction authorization).

Figure 9:
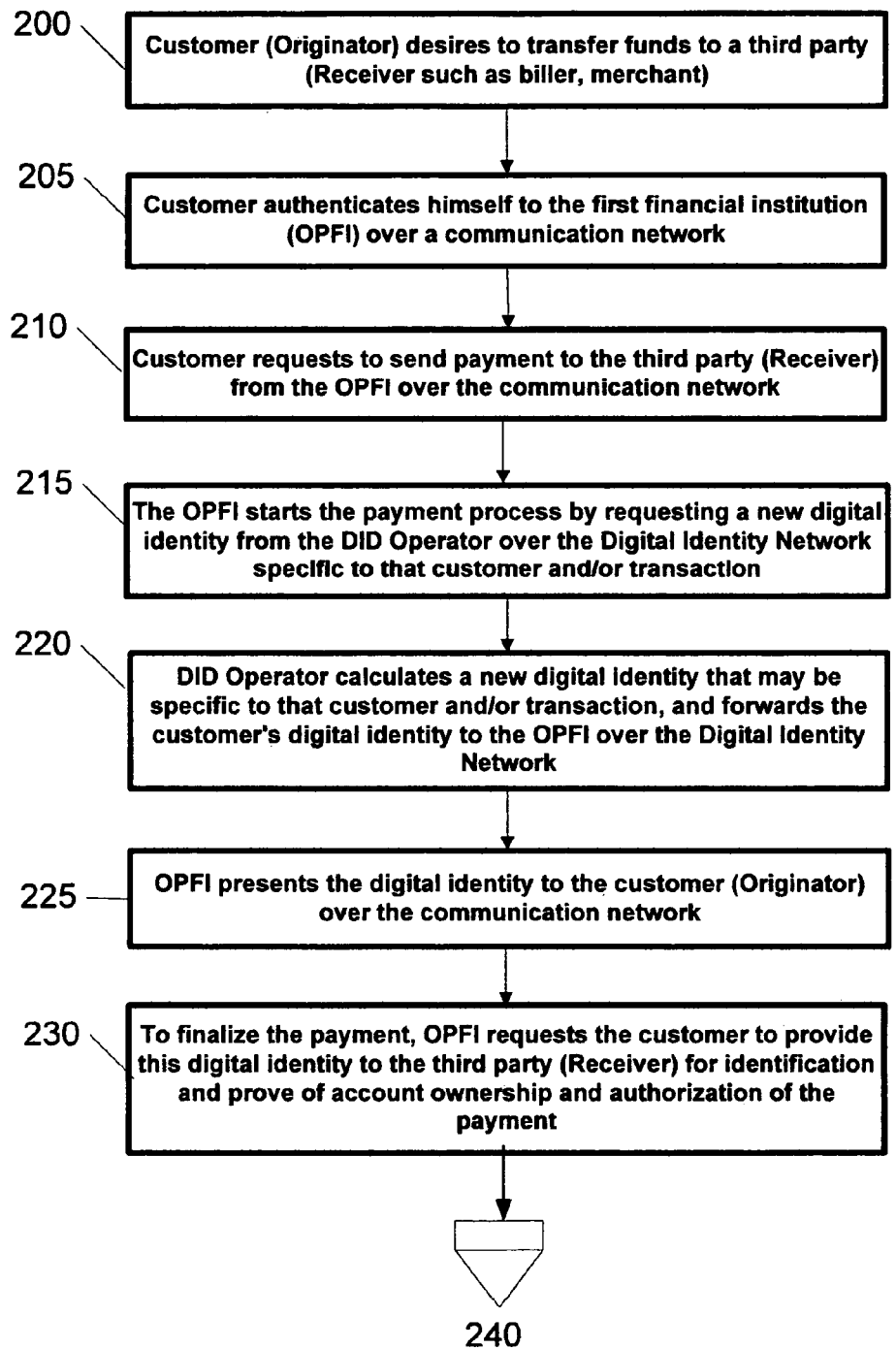
FIG. 9, 10, 11 are block diagrams illustrating the process flow of financial institutions utilizing direct authentication and authorization system and method to process an online payment transaction according to the present invention.
Figure 10:
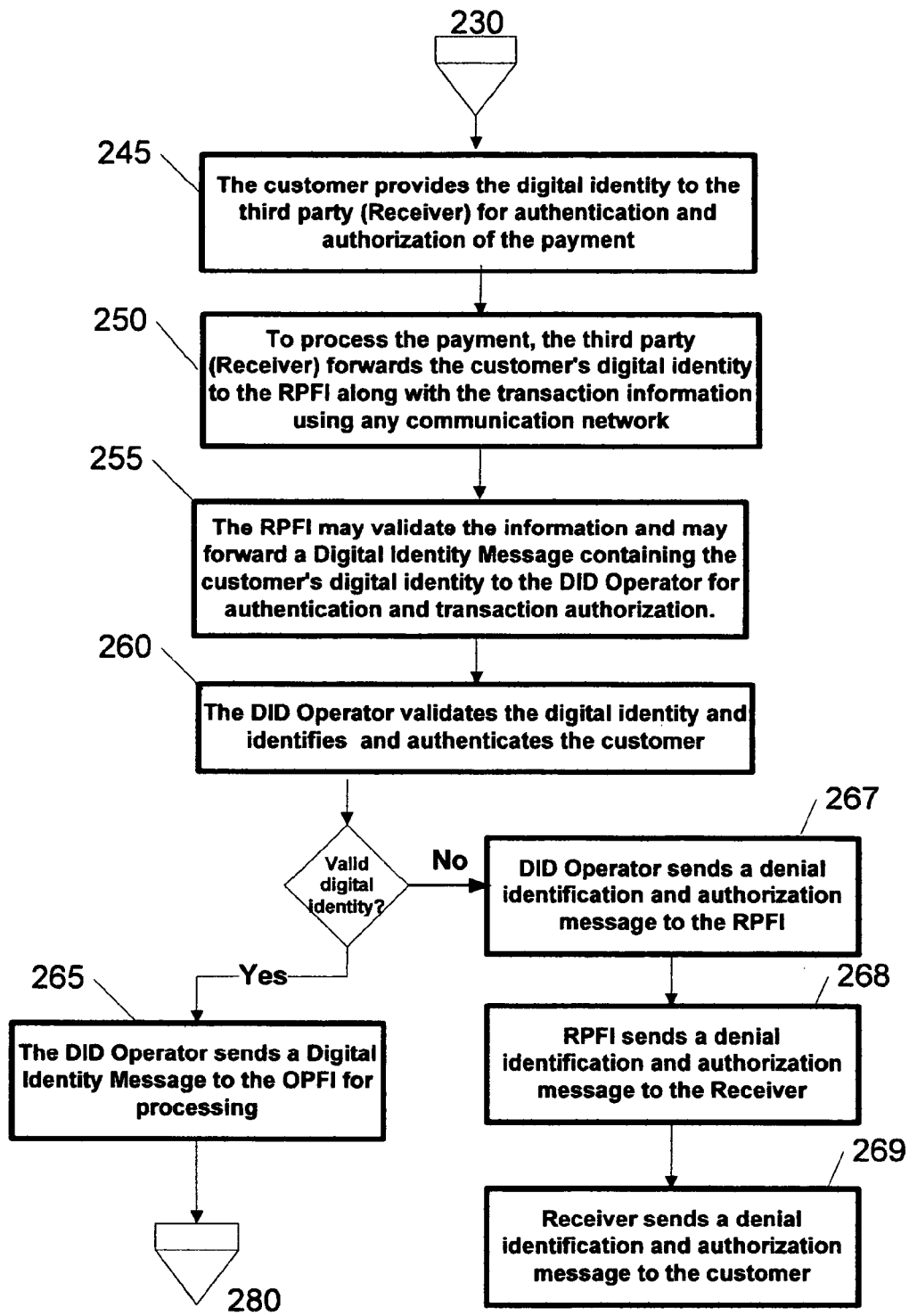
Figure 11:
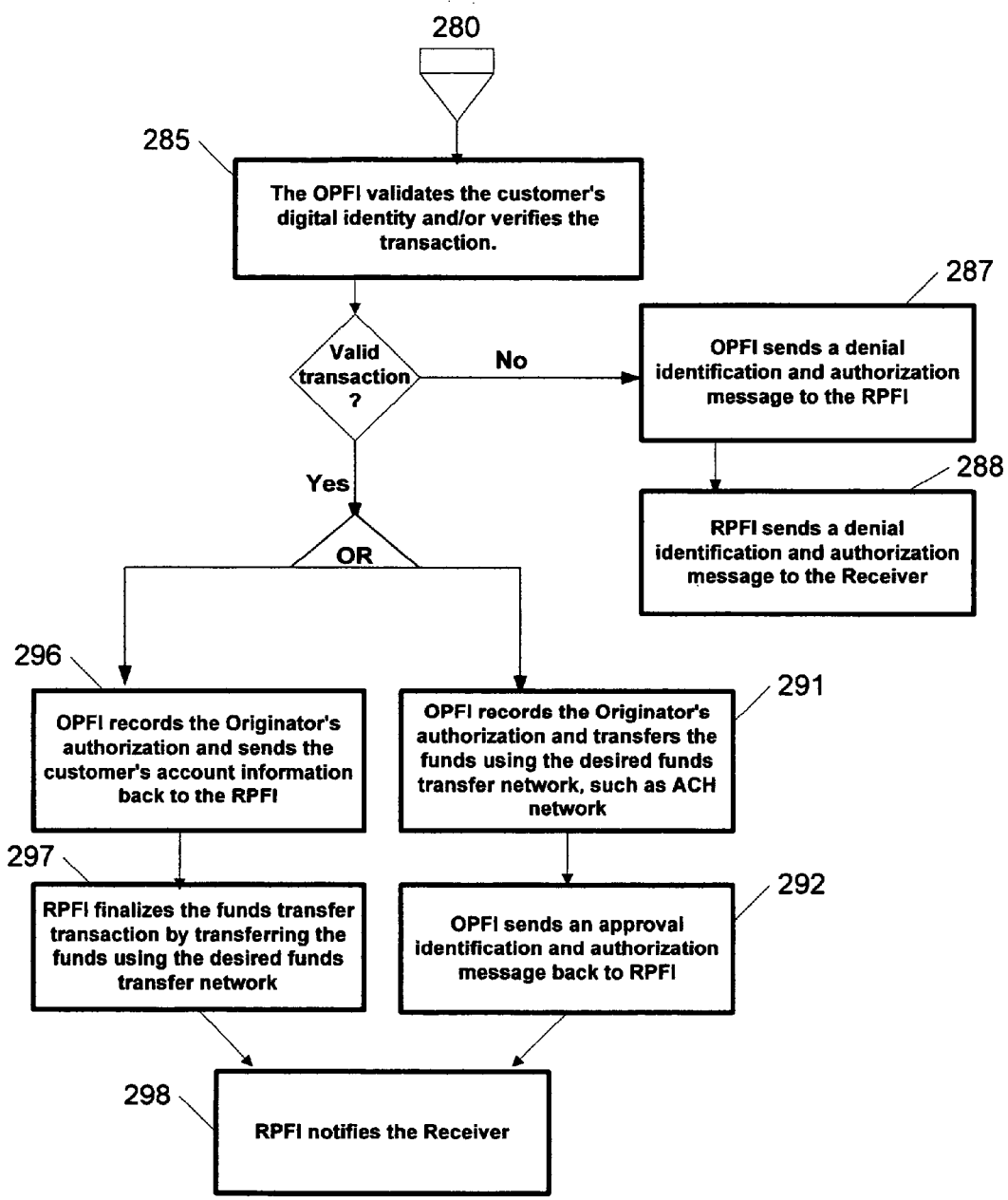

As another example FIG. 9, 10, 11, where identification, authorization and verification of account ownership at both side of the transaction are required is the online payment service. In an online payment transaction, the customer (Originator) 20 desires to pay a third party (Receiver) 40 such as online merchant from a financial account such as the checking account 200. The customer 20 authenticates him/herself to the first financial institution (OPFI) 25, 205 over a communication network 50 and requests to send the payment to the third party (Receiver) 40, 210. The OPFI 25 starts the payment process by requesting a new digital identity 10 from the DID Operator 30 over the Digital Identity Network 3 specific to that customer 20 and/or transaction 215.

The DID Operator 30 that manages the Digital Identity System 1, processes the request, calculates a new digital identity 10 that may be specific to that customer 20 and/or transaction, and forwards the customer's digital identity 10 to the OPFI 25 over the Digital Identity Network 3, 220. For security reasons, the customer's digital identity 10 could be time dependent and may be valid for one-time use.

When the OPFI 25 receives the customer's digital identity 10 from the DID Operator 30, the OPFI 25 present that to the customer (Originator) 20 over the communication network 50, 225. The OPFI 25 might also record the digital identity 10 along with the transaction information for its authentication and authorization purposes. In addition to providing the digital identity 10 to the customer 20 (Originator), the OPFI 25 may request the customer (Originator) 20 to provide the digital identity 10 to the third party (Receiver) 40 to finalize and complete the payment transaction 230. Since the customer's digital identity 10 is used for identification, authorization of payment and as evidence of account ownership, the payment will not be finalized unless the customer 20 provides his/her digital identity 10 to the third party (Receiver) 40.

The customer (Originator) 20 provides the digital identity received from OPFI 25 to the third party (Receiver) 40 for authentication and authorization of the payment. By providing the digital identity to the third party (Receiver) 40, the customer 20 proves the account ownership at the originating bank (OPFI) 25 and his assent to the payment transaction. The third party (Receiver) 40 may also request the customer 20 to provide other customer specific information for validation. To process the payment, the Receiver 40 forwards the customer's 20 digital identity to the RPFI 35 along with the transaction information using any communication network 50, 250.

The RPFI 35 may validate the information provided by the customer 20 and for validation of customer's digital identity 10 and the transaction processing, the RPFI 35 may forward a Digital Identity Message 15 containing the customers digital identity 10 to the DID Operator for authentication and transaction authorization 255.

The DID Operator 30, upon receiving the Digital Identity Message from the RPFI 35, validates the customer's digital identity 10, identifies and authenticates the customer (Originator/Receiver) 20, 40, 260. Upon successful validation and identification, the DID Operator 30 may send a Digital Identity Message containing the customer's digital identity 10 and possibly other transaction information to the OPFI 25 for processing 265. A denial identification and authorization message will be send to the RPFI, the Receiver and also the customer if the digital identity is invalid 267, 268, 269

The OPFI 25, upon receiving the Digital Identity Message from the DID Operator 30, may validate the customer's digital identity 10 and/or verifies the transaction 285. A valid digital identity 10 provides evidence that the customer 20 is the actual account owner at OPFI 35 and manifest customer's assent to the payment transaction. An invalid digital identity will cause a denial message to be sent to the RPFI, Receiver and to the customer 157, 158.

Upon successful validation, the OPFI 25 might record the transaction authorization and may either:
  finalizes the payment transaction by sending credit to receiver's 20 account at the RPFI 35 using the desired funds transfer network, such as ACH network and notifies the RPFI (credit push) 291; or
  sends the customer's 20 account information back to the RPFI 35, 296 and RPFI 35 finalizes the payment transaction by sending debit to the customer's 20 account at the OPFI 25 using the desired funds transfer network, such as ACH network (debit pull) 297.

The RPFI 35 may be responsible for notifying the Receiver 20 of the status of the transaction. To the RPFI 35, the validation of the customer's digital identity 10 is the evidence of the account ownership at the OPFI 25 and proves the customer's assent to the payment transaction (transaction authorization).

Those skilled in the art appreciate that the present invention may be embodied in various forms. In one embodiment, the Participating Financial Institutions (PFIs) 25, 35 might communicate directly with the customers (Originator and Receiver) 20, 40 and might be in charge of processing the transactions and transferring funds. In another embodiment, the DID Operator 35 might communicate directly with the customers (Originator and Receiver) 20, 40 and might be in charge of processing the transactions and transferring funds. Therefore, it will be apparent to those skilled in the art that in processing the transactions and transferring funds many different forms are possible. It is not intended to limit the scope of the invention to the particular form set forth, but on the contrary, it is intended to cover such alternatives, modifications, and equivalents as may be included within the spirit and scope of the invention.

We claim:

1. A method for performing a secure transaction between an Originating Participating Financial Institution and a Receiving Participating Financial Institution on behalf of an Originator initiating the transaction, the method comprising the steps of:
    a) providing a Digital Identity Operator connecting the Originating Participating Financial Institution to the Receiving Participating Financial Institution via a trusted Digital Identity Network;
    b) an Originator authenticating himself to the Originating Participating Financial Institution to initiate the transaction;
    c) upon successful authentication, the Originating Participating Financial Institution submitting a request for a new digital identity for the Originator to the Digital Identity Operator;
    d) the Digital Identity Operator processing the request, dynamically generating a new digital identity that is non-predictable, time dependent and unique to the Originator only, and returning said digital identity to the Originating Participating Financial Institution;
    e) the Originating Participating Financial Institution receiving said dynamically generated digital identity and providing said digital identity to the Originator;
    f) the Originator providing said digital identity to the Receiving Participating Financial Institution either directly, or indirectly through a Receiver;
    g) the Receiving Participating Financial Institution validating said digital identity by forwarding said digital identity to the Digital Identity Operator; and
    h) upon receiving a Digital Identity Message, the Originating Participating Financial Institution and Receiving Participating Financial Institution performing the transaction.

2. The method of claim 1, wherein the Digital Identity Operator validates said digital identity based at least in part upon whether said digital identity is from the Originator.

3. The method of claim 1, wherein said digital identity submitted to the Receiving Participating Financial Institution provides at least the same level of assurance as a physical signature, thereby manifesting the Originator's assent to the transaction.

4. The method of claim 1, wherein the transaction corresponds to a non-financial transaction comprising an identity authentication and/or express agreement.

5. The method of claim 1, wherein said digital identity submitted to the Receiving Participating Financial Institution enables the Receiving Participating Financial Institution to authenticate the Originator.

6. The method of claim 1, wherein the transaction corresponds to an account to account funds transfer, an inter-bank funds transfer, a credit push, and/or a debit pull.

7. A system for performing a secure transaction between an Originating Participating Financial Institution and a Receiving Participating Financial Institution on behalf of an Originator initiating the transaction, the system comprising:
    a Digital Identity Operator connecting the Originating Participating Financial Institution to the Receiving Participating Financial Institution via a trusted Digital Identity Network;
    an Originator that initiates the transaction by authenticating himself to the Originating Participating Financial Institution over a communication network;
    the Digital Identity Operator adapted to receive a request for a new digital identity from the Originating Participating Financial Institution and dynamically generate a digital identity that is non-predictable, time dependent and unique to the Originator only, and to return said digital identity to the Originating Participating Financial Institution;
    the Originating Participating Financial Institution further adapted to receive said generated digital identity and provide said digital identity to the Originator;
    whereby the Originator provides said digital identity to the Receiving Participating Financial Institution either directly, or indirectly through a Receiver;
    the Receiving Participating Financial Institution adapted to validate said digital identity by forwarding said digital identity to the Digital Identity Operator;
    the Digital Identity Operator further adapted to validate said digital identity and, if valid, to send a Digital Identity Message to the Originating Participating Financial Institution and/or Receiving Participating Financial Institution;
    whereby upon receipt of the Digital Identity Message, the Originating Participating Financial Institution and the Receiving Participating Financial Institution perform the transaction.

8. The system of claim 7, wherein the Digital Identity Operator validates said digital identity based at least in part upon whether the digital identity is from the Originator.

9. The system of claim 7, wherein the digital identity submitted to the Receiver provides at least the same level of assurance as a physical signature, thereby manifesting the Originator's assent to the transaction.

10. The system of claim 7, wherein the transaction corresponds to a non-financial transaction.

11. The system of claim 10, wherein the non-financial transaction corresponds to an identity authentication and/or express agreement.

12. The system of claim 7, wherein the transaction corresponds to an account to account funds transfer, an inter-bank funds transfer, a credit push, and/or a debit pull.

13. A system for authenticating an Originator and receiving the Originator's authorization for a secure transaction in e-commerce based on digital identity, the system comprising:
    an Originator in communication with a Receiver over a public communication network and needing to perform a secure transaction with the Receiver;
    the Receiver adapted to require the Originator to authenticate himself and authorize the transaction by providing a valid digital identity before performing the transaction;
    the Originator further in communication with an Originating Participating Financial Institution;
    the Originating Participating Financial Institution adapted to request and receive a dynamically-generated non-predictable and time-dependent digital identity from a Digital Identity Operator, wherein said dynamically-generated digital identity is unique to the Originator only;

the Originating Participating Financial Institution adapted to forward said digital identity to the Originator;

whereby the Originator submits said digital identity to the Receiver and the Receiver forwards said digital identity to the Digital Identity Operator for verification and validation; and whereby upon successful validation by the Digital Identity Operator, the Receiver positively authenticates the Originator and receives proof of the Originator's authorization for the transaction.

14. The system of claim 13, wherein the Receiver is in communication with the Digital Identity Operator via a Receiving Participating Financial Institution.

15. The system of claim 14, wherein the Receiver and Originator perform the transaction via the Receiving Participating Financial Institution and the Originating Participating Financial Institution, respectively.

16. The system of claim 13, wherein the Digital Identity Operator validates said digital identity based at least in part upon whether the digital identity is from the Originator.

17. The system of claim 13, wherein the digital identity submitted to the Receiving Participating Financial Institution provides at least the same level of assurance as a physical signature, thereby manifesting the Originator's assent to the transaction.

18. The system of claim 13, wherein the transaction corresponds to a non-financial transaction.

19. The system of claim 18, wherein the non-financial transaction corresponds to an identity authentication and/or express agreement.

20. The system of claim 13, wherein the transaction corresponds to an account to account finds transfer, an inter-bank funds transfer, a credit push, and/or a debit pull.

* * * * *